United States Patent
Schlegel et al.

[15] 3,687,523
[45] Aug. 29, 1972

[54] EIGHT-LENS APOCHROMATIC OBJECTIVE

[72] Inventors: Franz Schlegel; Josef Graf, both of Munich, Germany

[73] Assignee: Optische Werke G. Rodenstock, Munich, Germany

[22] Filed: Oct. 12, 1970

[21] Appl. No.: 80,103

[30] Foreign Application Priority Data

Oct. 10, 1969    Germany..........P 19 51 148.9

[52] U.S. Cl..................................350/220, 350/234
[51] Int. Cl................................................G02b 9/58
[58] Field of Search......................................350/220

[56] References Cited

FOREIGN PATENTS OR APPLICATIONS 1,280,570   10/1968   Germany...................350/220

Primary Examiner—John K. Corbin
Attorney—Craig & Antonelli

[57] ABSTRACT

An eight lens apochromatic objective which includes two cemented collecting lens elements each consisting of three lenses that enclose the diaphragm; each cemented collective lens element includes a biconcave lens made of short flint glass in the center adjoined by two further lenses; each three-component and cemented collective element is adjoined at predetermined spacing by a single meniscus lens, these two single lenses enclosing a three-lens cemented collective lens elements; the collective lenses enclosing the short flint biconcave lens are made from glasses with long-crown properties, whereby one of these collective lenses brings about the apochromatic correction for the blue color and the other for the red color.

5 Claims, 1 Drawing Figure

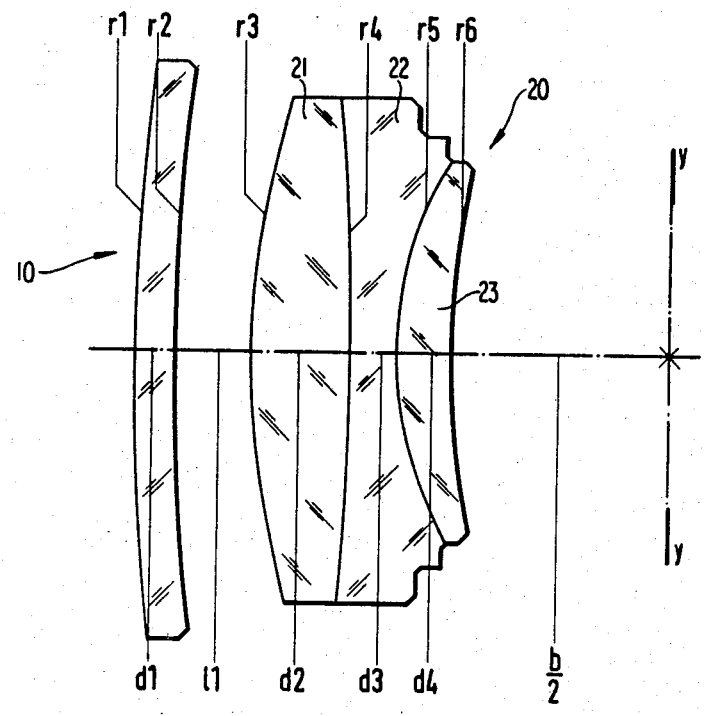

EIGHT-LENS APOCHROMATIC OBJECTIVE

The present invention relates to an apochromatic, preferably symmetrical lens of an angular field of about 40°–45 with an aperture ratio of about 1 : 9 to 1 : 15, which is utilized for reproduction purposes especially in connection with long focal lengths. In that case, the correction of the chromatic aberrations plays the dominant role; it is not sufficient merely to follow the customary rules of the apochromatism but one must aim at causing the chromatic intercept or back focal length difference for a fourth color to at least approach the zero value and therebeyond with scales, which deviate substantially from 1 : 1, to keep as small as possible the coma. This applies especially for the distortion which should not exceed the amount of one promil (7%) even for images of objects at infinity in the focal plane of the image space, and also for the chromatic magnifying error, which is to remain unnoticeable also for high demands of the image.

In the lens according to the present invention, the diaphragm is enclosed by two collective cemented compound elements which consist each of three lenses; the chromatic properties of the types of glass utilized therefor is determinative primarily for the chromatic correction. These cemented compound elements are enclosed on both sides by two single meniscus lenses; the refractive index and color dispersion thereof may vary within large ranges and is utilized, in the first instance, to reduce to a minimum the distortion in connection with image scales larger or smaller then one and, in the second instance, to cause in this case the chromatic magnifying error, i.e., chromatic difference of magnification to disappear as much as possible, which results from the unavoidable tolerances of the individual glass melts for the lenses of the collective cemented elements. In this regard, the present invention includes a surprisingly large range of the refractive indices and of the Nu values for these dispersing or scattering meniscus lenses.

Lenses of the type of construction described above are known already on the prior art, also with apochromatic correction, for example, as disclosed in German Pat No. 1,280,570; however, they do not possess the characteristics of an improved apochromatism in the sense of the aforementioned specifications and therefore cannot fulfill the demands made as regards the image quality.

As mentioned, the apochromatism of higher order is attained by a suitable selection of the glasses in the three-lens cemented collective elements adjacent the diaphragm. An asymmetrical biconcave lens made from short-flint (KZF) is enclosed by collective lenses which consist of glasses with long-crown properties. Proper consideration is thereby given to the principle, favorable for the elimination of the geometric errors; namely, that the refractive indices of the glasses increase outwardly from the diaphragm. The apochromatic effect is distributed over the two collective lenses in such a manner that the glass of one of the two collective lenses matches essentially the back focal length (distance between back lens and image) in the extreme blue and violet, possibly also in the adjacent ultraviolet to that of the brightest visible rays, whereas the glass of the other collective lens carries out this adaptation preferably for the red end of the spectrum. Particularly suited in that regard are deep-flint glasses for the blue correction and heavy-crown glasses for the red correction, whereby the enclosed concave lens, as mentioned above, presupposes a normal short-flint glass.

Depending on the aperture ratio, for which a lens according to the present invention is corrected, the radii of curvature vary a little with a view toward a minimum of the zone errors. Added thereto are the deviations of the refractive indices, especially for the rays at the ends of the spectrum, which are different from melt to melt to an extent that, thanks to modern glass-melting technology, shows up only in the fourth or fifth decimal place of the refractive index but is of large influence for the degree of image quality required in that case. These differences are compensated by a glass selection which can be graded relatively coarsely, for the dispersing outer meniscus lenses. The refractive index may thus vary in connection with the glass thereof between about 1.54 and 1.60 and the Nu value thereof approximately between 35 and 55, preferably between 40 and 50. Similarly, the deflection may exhibit considerable differences in order — as already mentioned — to bring the residual distortion to a minimum.

Accordingly, it is an object of the present invention to provide an improved eight-lens apochromatic objective which avoids by simple means the aforementioned shortcomings and drawbacks encountered in the prior art.

Another object of the present invention resides in an apochromatic lens, preferably a symmetrical lens with an aperture ratio of 1 : 9 to 1 : 15, which has a reduced distortion as well as reduced chromatic magnifying error.

A further object of the present invention resides in a lens of the type described above which permits ready correction of chromatic error and compensation for variations from one glass melt to the next.

These and further objects, features and advantages of the present invention will become more obvious from the following description when taken in connection with the accompanying drawing which shows, for purposes of illustration only, one embodiment in accordance with the present invention, and wherein:

The single FIGURE is a longitudinal cross-sectional view through one embodiment of a lens in accordance with the present invention.

Referring now to the single figure of the drawing, reference numeral 10 generally designates a diverging meniscus having surfaces with radii of curvature $r_1$ and $r_2$ and an axial thickness equal to $d_1$. The single diverging meniscus lens 10 is adjoined in the direction toward the plane of symmetry $y-y$ of the lens, by a cemented collective three-lens element generally designated by reference numeral 20 which consists of an asymmetrical biconvex element 21 with surfaces having radii of curvature $r_3$ and $r_4$ and an axial thickness $d_2$ of an asymmetrical biconcave element 22 with surfaces having radii of curvature of $r_4$ and $r_5$ and an axial thickness $d_3$ and of a converging meniscus 23 having surfaces with radii of curvature $r_5$ and $r_6$ and an axial thickness $d_4$. The lenses 21 and 22 are cemented together along their adjacent surfaces with a radius of curvature $r_4$ and the lenses 22 and 23 are cemented together along their adjacent surfaces with a radius of curvature $r_5$. The axial spacing between the surface having the radius of curvature $r_2$ of the diverging meniscus 10 and the surface with the radius of curvature $r_3$ of the biconvex element 21 is indicated by $l_1$. The spacing between the surface with the radius of curvature $r_6$ of the converging meniscus element 23 and the plane of symmetry $y-y$, as measured along the axis. is $b/2$. The lens system according to the present invention, as mentioned above, is symmetrical with respect to the plane $y-y$, i.e., only one symmetrical half thereof is shown, the lens system including another three-lens cemented collective element disposed symmetrically at a distance $b/2$ on the other side of the plane of symmetry $y-y$, which in turn is adjoined, at an axial spacing $l_1$ by another single diverging meniscus element, similar to the element 10.

Two typical examples of a lens in accordance with the present invention are set forth in the following tabulation, whereby any suitable units are used for the dimensions thereof with the values given for Example I illustrated in the single figure of the drawing:

| Example | | I | | II | |
|---|---|---|---|---|---|
| Aperture Ratio | | 1 : 15 | | 1 : 16 | |
| Focal Distance | | 1005.3 | | 1198.6 | |
| $r_1$ | | + 395.3 | | + 506.6 | |
| | $d_1$ | 7.3 | | 8.7 | |
| | $n_1/v_1$ | 1.5517/45.1 | LLF7 | 1.5926/40.66 | LF2 |
| $r_2$ | | + 353.5 | | + 453.2 | |
| | $l_1$ | 13.2 | | 15.7 | |
| $r_3$ | | + 149.6 | | + 178.5 | |
| | $d_2$ | 17.40 | | 20.8 | |
| | $n_2/v_2$ | 1.64129/55.15 | SK18 | | SK18 |
| $r_4$ | | − 604.3 | | − 720.8 | |
| | $d_3$ | 8.56 | | 10.2 | |
| | $n_3/v_3$ | 1.5538/49.41 | K.F1 | | K.F1 |
| $r_5$ | | + 63.78 | | + 76.08 | |
| | $d_4$ | 9.86 | | 11.75 | |
| | $n_4/v_4$ | 1.51356/50.70 | TiF1 | | TiF1 |
| $r_6$ | | + 150.2 | | + 179.1 | |
| | $b/2$ | 37.5 | | 44.75 | |
| | | and Symmetrical | | and Symmetrical | |
| $s'$ for 1 : 1 | | 1920.5 | | 2289.9 | |

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An eight-lens apochromatic objective, essentially consisting of two cemented, collecting three-lens elements which enclose between them the diaphragm and of two simple, meniscus-shaped dispersion lenses enclosing between them the two three-lens elements, wherein each collecting three-lens element is formed from two collecting lenses and one double concave dispersion lens of short flint enclosed by these collecting lenses, and wherein the indices of refraction increase from the diaphragm toward the outside, characterized in that the collecting lenses enclosing the double concave dispersion lens consist of glasses with long crown properties, wherein essentially one of these collecting lenses effects the apochromatic correction in the blue region, and the other in the red region; and that the index of refraction, as well as the Nu value of the glasses of the external, meniscus-shaped dispersion lenses are selected in dependence on the refractive-index deviations of the glass melts employed for the three-lens elements; and wherein the ratios of the indices of refraction to the Nu values of the respective outermost of the two collecting lenses, the one double concave dispersion lens, and the innermost of the two collecting lenses are, respectively, approximately equal to 1,64129/55.15 1.5538/49.41 and 1.51356/50.70.

2. An objective according to claim 1, characterized in that the refractive index of the glasses of the single scattering lenses amounts to about 1.51 and 1.6 and the Nu values thereof between about 35 to 55.

3. An objective according to claim 2, characterized in that the Nu values amount to about 40 to 50.

4. An objective according to claim 1, characterized by the following data in suitable units:

| $r_1$ | | + 395.3 | |
|---|---|---|---|
| | $d_1$ | 7.3 | |
| | $n_1/v_1$ | 1.5517/45.1 | LLF7 |
| $r_2$ | | + 353.5 | |
| | $l_1$ | 13.2 | |
| $r_3$ | | + 149.6 | |
| | $d_2$ | 17.40 | |
| | $n_2/v_2$ | 1.64129/55.15 | SK18 |
| $r_4$ | | − 604.3 | |
| | $d_3$ | 8.56 | |
| | $n_3/v_3$ | 1.5538/49.41 | K.F1 |
| $r_5$ | | + 63.78 | |
| | $d_4$ | 9.86 | |
| | $n_4/v_4$ | 1.51356/50.70 | TiF1 |
| $r_6$ | | + 150.2 | |
| | $b/2$ | 37.5 | |
| | | and Symmetrical | |
| $s'$ for 1 : 1 | | 1920.5 | |

5. An objective according to claim 1, characterized by the following data in suitable units:

| $r_1$ | | + 506.6 | |
|---|---|---|---|
| | $d_1$ | 8.7 | |
| | $n_1/v_1$ | 1.5926/40.66 | LF2 |
| $r_2$ | | + 453.2 | |
| | $l_1$ | 15.7 | |
| $r_3$ | | + 178.5 | |
| | $d_2$ | 20.8 | |
| | $n_2/v_2$ | 1.64129/55.15 | SK18 |
| $r_4$ | | − 720.8 | |
| | $d_3$ | 10.2 | |
| | $n_3/v_3$ | 1.5538/49.41 | K.F1 |
| $r_5$ | | + 76.08 | |
| | $d_4$ | 11.75 | |
| | $n_4/v_4$ | 1.51356/50.70 | TiF1 |
| $r_6$ | | + 179.1 | |
| | $b/2$ | 44.75 | |
| | | and Symmetrical | |
| $s'$ for 1 : 1 | | 2289.9 | |

* * * * *